June 9, 1925.  1,541,518
P. H. McCAIN
THUMB OR WING SCREW
Filed Feb. 16, 1925
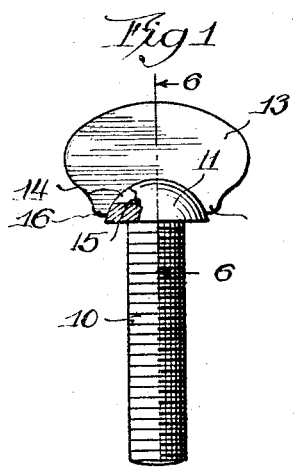
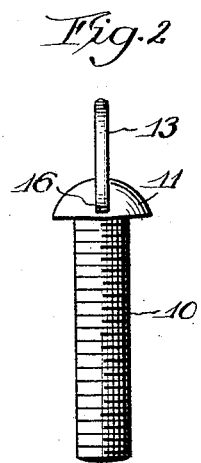
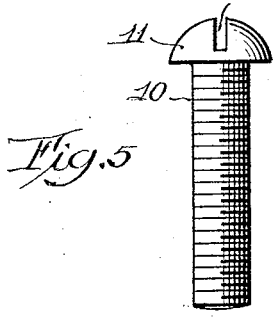
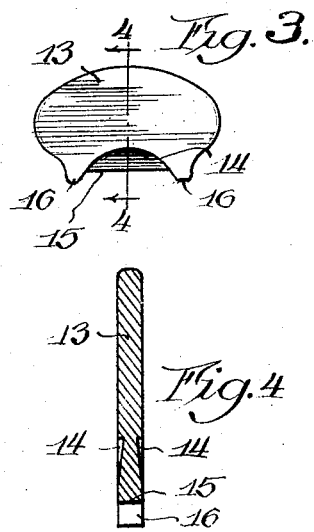
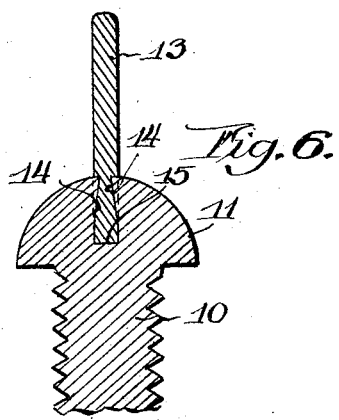
Inventor,
Paul H. McCain,
By ......... Atty.

Patented June 9, 1925.

1,541,518

UNITED STATES PATENT OFFICE.

PAUL H. McCAIN, OF CHICAGO, ILLINOIS.

THUMB OR WING SCREW.

Application filed February 16, 1925. Serial No 9,478.

*To all whom it may concern:*

Be it known that I, PAUL H. McCAIN, a citizen of the United States, residing at Chicago, in the county of Cook and State of Illinois, have invented certain new and useful Improvements in Thumb or Wing Screws, of which the following is a specification.

This invention relates to improvements in thumb or wing screws and one of the objects of the invention is to provide improved means for securing a wing or finger piece in the kerf or groove in the head of a screw and thereby convert an ordinary screw into a thumb or wing screw.

Heretofore in the manufacture of screws of this character, the finger piece which has been inserted in the kerf or groove of the head of the screw has been provided with an opening extending entirely therethrough and the finger piece is secured to the screw by forcing portions of the head of the screw into the opening, with the result that the material of the screw head is deflecting over sharp corners or edges, which is objectionable for the reason that when it is attempted to drive a screw constructed in this manner by gripping the finger piece or wing the tendency of the edge of the opening is to shear off the portion of the head of the material that enters the opening so that the finger piece becomes detached therefrom.

It is one of the objects of the present invention to provide an improved construction and manner of securing the wing or thumb piece in the slot or kerf in the head of the screw, the parts being so constructed that any attempt to pull the wing or finger piece out of the slot in the screw head will cause a wedging action between the parts and it will be necessary to bend or distort the entire head of the screw before the finger piece or wing can be torn loose.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a view in side elevation, partly broken away of a screw of this character, constructed in accordance with the principles of this invention.

Figure 2 is an end elevation of Figure 1.

Figure 3 is a side elevation of the finger piece or wing detached.

Figure 4 is a sectional view taken on line 4—4, Figure 3.

Figure 5 is an elevation of the screw.

Figure 6 is an enlarged detail sectional view taken on line 6—6, Figure 1.

Referring more particularly to the drawing the numeral 10 designates an ordinary screw having a diametrically enlarged head 11 at one end thereof provided with a kerf or slot 12 throughout its diameter.

A wing or thumb piece 13 is initially formed separate from the screw and may be of any desired size and configuration but is of a width at its base slightly less than the internal diameter of the kerf 12 so that when the edge of the wing or thumb piece 13 is inserted in the kerf, the base of the wing will substantially fill the kerf.

The base or edge of the wing which is inserted in the kerf is of a length preferably slightly greater than the diameter of the head 11 of the screw, and in each face of the wing is provided a recess 14 formed by depressing portions of the lateral faces of the wing. These depressions are shaped so that they will gradually increase in depth from the base portion 15 of the wing toward the opposite edge thereof to form a wedge shaped portion at the bottom of the wing, as shown more clearly in Figure 4.

The extremities 16 of the base of the wing preferably project for short distances below the base 15 so that when the wing is placed in position in the kerf the extremities 16 will stand adjacent and engage the periphery of the head 11 beyond the bottom of the kerf 12.

The depressions 14 may be of any desired contour but are preferably of a shape to conform to the contour of the head 11.

The wing thus formed is inserted in the kerf 12 with the base 15 of the depressed portions engaging and resting upon the bottom of the kerf. Portions of the head 11 adjacent the lateral faces of the wing or finger piece 13 are then forced into the recesses 14 by upsetting or otherwise compressing the head.

With this construction it will be noted that there will be formed opposed wedge shaped portions or faces between the walls of the kerf and the bottom walls of the recesses 14 so that any attempt to draw the wing or finger piece 13 out of the kerf will result in a wedging action, thereby necessitating the deflection of the entire head before the wing or finger piece can be torn loose from the screw.

With this improved construction it will also be manifest that inasmuch as the portions of the head which are forced into the recesses 14 will not be shaped or deflected over sharp corners or edges, there will be no tendency to shear off any portion of the head when the thumb piece or wing is twisted.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A new article of manufacture embodying a screw provided with an enlarged head having a kerf extending thereacross, a separate finger piece having depressions formed in the lateral faces of the finger piece adjacent one edge thereof, the portion of the finger piece having the depressions therein being disposed within the kerf of said head, portions of the head adjacent the said depressions being forced into the said depressions and into contact with the bottoms thereof.

2. A new article of manufacture embodying a screw provided with an enlarged head having a kerf extending thereacross, a separate finger piece having depressions formed in the lateral faces of the finger piece adjacent one edge thereof, the said depressions gradually increasing in depth from the said edge of the finger piece towards the opposite edge, the portion of the finger piece having the depressions therein being disposed within the kerf of said head, portions of the head adjacent the said depressions being forced into the said depressions and into contact with the bottoms thereof.

3. A new article of manufacture embodying a screw provided with an enlarged head having a kerf extending thereacross, a separate finger piece having depressions formed in the lateral faces of the finger piece adjacent one edge thereof, the portions of the lateral faces of the said finger piece forming the bottoms of said depressions converging from the said edge of said finger piece towards the opposite edge, the portion of the finger piece having the depressions therein being disposed within the kerf of said head, portions of the head adjacent the said depressions being forced into the said depressions and into contact with the bottoms thereof.

4. A new article of manufacture embodying a screw provided with an enlarged head having a kerf extending thereacross, a separate finger piece having depressions formed in the lateral faces of the finger piece adjacent one edge thereof, the portion of the finger piece having the depressions therein being disposed within the kerf of said head, portions of the head adjacent the said depressions being forced into the said depressions and into contact with the bottoms thereof, a portion of said edge of the finger piece extending beyond the said kerf and resting against the periphery of the head of the screw.

5. A new article of manufacture embodying a screw provided with an enlarged head having a kerf extending thereacross, a separate finger piece having depressions formed in the lateral faces of the finger piece adjacent one edge thereof, the portion of the finger piece having the depressions therein being disposed within the kerf of said head, portions of the head adjacent the said depressions being forced into the said depressions and into contact with the bottoms thereof, the extremities of said finger piece extending beyond the ends of the kerf, portions of said extremities depending below that edge of the finger piece in which the said depressions are located and engaging the periphery of the head of the screw.

In testimony whereof I have signed my name to this specification, on this 11th day of February, A. D. 1925.

PAUL H. McCAIN.